United States Patent
Liu et al.

(10) Patent No.: US 11,711,711 B2
(45) Date of Patent: *Jul. 25, 2023

(54) METHOD FOR CONFIGURING MEASUREMENT GAP, ACCESS NETWORK DEVICE AND TERMINAL

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 80 days.

This patent is subject to a terminal disclaimer.

(21) Appl. No.: 17/203,212

(22) Filed: Mar. 16, 2021

(65) Prior Publication Data

US 2021/0211916 A1 Jul. 8, 2021

Related U.S. Application Data

(63) Continuation of application No. 16/696,723, filed on Nov. 26, 2019, now Pat. No. 10,986,523, which is a
(Continued)

(51) Int. Cl.
  *H04W 4/00* (2018.01)
  *H04W 24/10* (2009.01)
  *H04W 76/15* (2018.01)

(52) U.S. Cl.
  CPC ........... *H04W 24/10* (2013.01); *H04W 76/15* (2018.02)

(58) Field of Classification Search
  CPC ............................. H04W 24/10; H04W 76/15
  See application file for complete search history.

(56) References Cited

U.S. PATENT DOCUMENTS 9,554,325 B2 * 1/2017 Suga .................. H04W 48/16
2010/0316000 A1 12/2010 Burbidge
(Continued)

FOREIGN PATENT DOCUMENTS

CN 103037399 A 4/2013
CN 103096373 A 5/2013
(Continued)

OTHER PUBLICATIONS

Huawei, HiSilicon. General LTE-NR DC measurement consideration[online], 3GPP TSG RAN WG2 #98 R2-1705134, Internet<URL:http://www.3gpp.org/ftp/tsg_ran/WG2_RL2/TSGR2_98/Docs/R2-1705134.zip>, May 19, 2017.
(Continued)

Primary Examiner — Chi H Pham
Assistant Examiner — Elisabeth Benoit Magloire
(74) Attorney, Agent, or Firm — Ladas & Parry LLP (57) ABSTRACT

A method for configuring a measurement gap is provided. The method is used in a first access network device of at least two access network devices that have established connections with a terminal. The method includes: when the first access network device is a configuration device among the at least two access network devices, the first access network device generates measurement gap configuration information; here, the configuration device is an access network device, that configures a measurement gap for the terminal, as a part of the at least two access network devices, and the measurement gap is used to indicate a period of time during which the terminal performs signal measurement at a frequency point except a present working frequency point; and the first access network device sends the measurement gap configuration information to the terminal.

28 Claims, 4 Drawing Sheets

Related U.S. Application Data continuation of application No. PCT/CN2017/088503, filed on Jun. 15, 2017.

(56) References Cited

U.S. PATENT DOCUMENTS

| | | | |
|---|---|---|---|
| 2012/0252442 A1 | 10/2012 | Fu | |
| 2013/0114446 A1 | 5/2013 | Liu et al. | |
| 2014/0146699 A1 | 5/2014 | Axmon | |
| 2014/0228027 A1 | 8/2014 | Kuo | |
| 2015/0003266 A1* | 1/2015 | Guo | H04W 24/10 370/252 |
| 2015/0351132 A1 | 12/2015 | Park et al. | |
| 2016/0192367 A1 | 6/2016 | Xue | |
| 2016/0219415 A1 | 7/2016 | Purohit | |
| 2016/0219475 A1 | 7/2016 | Kim | |
| 2016/0227571 A1 | 8/2016 | Baek et al. | |
| 2016/0338039 A1* | 11/2016 | Van Der Velde | H04W 74/0833 |
| 2017/0086110 A1 | 3/2017 | Wu et al. | |
| 2017/0150462 A1 | 5/2017 | Tsuboi et al. | |
| 2017/0164419 A1 | 6/2017 | Kim | |
| 2018/0063736 A1 | 3/2018 | Sadeghi et al. | |
| 2018/0227973 A1 | 8/2018 | Tsuboi et al. | |
| 2018/0279403 A1 | 9/2018 | Kim | |
| 2019/0059046 A1 | 2/2019 | Virtej et al. | |
| 2019/0082412 A1* | 3/2019 | Zander | H04W 56/0015 |
| 2019/0230580 A1 | 7/2019 | Kim et al. | |
| 2019/0364451 A1 | 11/2019 | Yang | |

FOREIGN PATENT DOCUMENTS

| | | |
|---|---|---|
| CN | 103888987 A | 6/2014 |
| CN | 105228198 A | 1/2016 |
| CN | 106233765 A | 12/2016 |
| EP | 3107328 A1 | 12/2016 |
| KR | 20150005458 | 1/2015 |
| RU | 2540118 C2 | 2/2015 |
| TW | 201703453 A | 1/2017 |
| WO | 2012171524 A1 | 12/2012 |
| WO | 2012171542 A1 | 12/2012 |
| WO | 2015196563 A1 | 12/2015 |
| WO | 2016177293 A1 | 11/2016 |
| WO | 2016187066 A1 | 11/2016 |

OTHER PUBLICATIONS

First Office Action of the Japanese application No. 2019-565211, dated May 25, 2021.

Second Office Action of the Chilean application No. 261903623, dated May 20, 2021.

Notice of Corrected Allowance of the U.S. Appl. No. 16/696,723, dated Mar. 16, 2021.

Notice of Corrected Allowance of the U.S. Appl. No. 16/696,723, dated Mar. 23, 2021.

3GPP TS 36.331 V11.2.0 (Dec. 2012), 3rd Generation Partnership Project; Technical Specification Group Radio Access Network; Evolved Universal Terrestrial Radio Access (E-UTRA); Radio Resource Control (RRC); Protocol specification (Release 11).

First Office Action of the Taiwanese application No. 107120594, dated Jul. 28, 2021.

First Office Action of the Australian application No. 2017419032. dated Jul. 29, 2022.

First Office Action of the Indonesian application No. P00202000355, dated May 13, 2022.

First Office Action of the Israeli application No. 271207, dated Jun. 27, 2022.

International Search Report in the international application No. PCT/CN2017/088503, dated Feb. 24, 2018.

Written Opinion of the International Search Authority in the international application No. PCT/CN2017/088503, dated Feb. 24, 2018.

Samsung. "Measurement gap for NR", 3GPP TSG-RAN WG2 Meeting #97bis R2-1702981, published on Mar. 25, 2017.

Huawei, HiSilicon. "Issues for measurement gap with beam sweeping and sparse reference signals", 3GPP TSG-RAN WG2#97bis R2-1703460, published on Mar. 25, 2017.

Supplementary European Search Report in the European application No. 17913520.7, dated Apr. 28, 2020.

Non-Final Office Action of the U.S. Appl. No. 16/696.723, dated Feb. 20, 2020.

Non-Final Office Action of the U.S. Appl. No. 16/696,723, dated Aug. 13, 2020.

Notice of Allowance of the U.S. Appl. No. 16/696,723, dated Dec. 16, 2020.

First Office Action of the Russian application No. 2019145329, dated Aug. 26, 2020.

First Office Action of the European application No. 17913520.7, dated Nov. 16, 2020.

First Office Action of the Canadian application No. 3065414, dated Feb. 1, 2021.

First Office Action of the Chilean application No. 201903623, dated Feb. 16, 2021.

Office Action of the Indian application No. 201917051497, dated Feb. 25, 2021.

First Office Action of the Korean application No. 10-2019-7036097, dated Mar. 11, 2021.

First Office Action of the Chinese application No. 202010072217.9, dated Oct. 9. 2022.

First Office Action of the Vietnamese application No. 1-2019-07269, dated Apr. 28, 2023.

\* cited by examiner

METHOD FOR CONFIGURING MEASUREMENT GAP, ACCESS NETWORK DEVICE AND TERMINAL

CROSS-REFERENCE TO RELATED APPLICATIONS

The application is a continuation application of U.S. patent application Ser. No. 16/696,723 filed on Nov. 26, 2019, which is a continuation application of PCT Application No. PCT/CN2017088503 filed on Jun. 15, 2017. The disclosures of both applications are incorporated by reference herein in their entity.

BACKGROUND

In a wireless communication system, during a connected state of a terminal with an access network device, signal measurement is usually needed at a frequency point besides a serving frequency point of a current cell accessed by the terminal.

In a related art, for saving cost and reducing mutual interference between different frequency points, an access network device may configure a measurement gap for a terminal, and the measurement gap indicates a period of time during which the terminal in a connected state performs signal measurement at a specified frequency point. Herein, the specified frequency point is a frequency point except a serving frequency point of a current cell accessed by the terminal.

Specifically, after a terminal accesses an access network device and when the access network device determines that a measurement gap is needed to be configured for the terminal, the access network device may transmit measurement gap configuration information to the terminal, so that the terminal is configured to switch to a specified frequency point from a serving frequency point of a current cell accessed by the terminal for signal measurement at the beginning of a period of time corresponding to the measurement gap and switch back to the serving frequency point of the current cell for data transmission at the end of the period of time corresponding to the measurement gap.

When the terminal performs signal measurement according to the measurement gap configured by the access network device, the terminal needs to interrupt data transmission at the serving frequency point of the current cell accessed by the terminal. With continuous development of the field of communications, more and more terminals support establishment of connections with at least two access network devices. According to a solution in the related art, each access network device connected with a terminal may configure a measurement gap for the terminal, and the terminal is configured with more measurement gaps. In such case, the terminal needs to frequently interrupt data transmission and switch to another frequency point for signal measurement, thereby affecting an efficiency of data transmission of the terminal.

SUMMARY

Embodiments of the disclosure relate to the field of communications, and more particularly to a method for configuring a measurement gap, access network device and terminal.

In order to solve the technical problem in the related art that an efficiency of data transmission of a terminal is affected due to the fact that when the terminal supports establishment of connections with at least two access network devices, and each access network device configures a measurement gap for the terminal and thus the terminal needs to frequently interrupt data transmission and switch to another frequency point for signal measurement, the embodiments of the disclosure provide a method for configuring a measurement gap, access network device and terminal. The technical solutions are as follows.

According to a first aspect of the embodiments of the disclosure, a method for configuring a measurement gap is provided. The method may be used in a first access network device of at least two access network devices that have established connections with a terminal, and the method includes the following operations.

When the first access network device is a configuration device among the at least two access network devices, the first access network device generates measurement gap configuration information. Here, the configuration device is an access network device, that configures a measurement gap for the terminal, as a part of the at least two access network devices, and the measurement gap is used to indicate a period of time during which the terminal performs signal measurement at a frequency point except a present working frequency point.

The first access network device sends the measurement gap configuration information to the terminal.

According to a second aspect of the embodiments of the disclosure, a method for configuring a measurement gap is provided, which may include the following operations.

A terminal receives measurement gap configuration information sent by each of all or part of at least two access network devices. Here, the at least two access network devices have established connections with the terminal, the measurement gap configuration information is used for configuring a measurement gap for the terminal, and the measurement gap is used to indicate a period of time during which the terminal performs signal measurement at a frequency point except a present working frequency point.

The terminal determines measurement gap configuration information to be reserved from the measurement gap configuration information sent by each of all or part of the at least two access network devices.

According to a third aspect of the embodiments of the disclosure, an access network device is provided. The access network device is a first access network device of at least two access network devices that have established connections with a terminal, and the access network device comprises a processor and a transceiver.

The processor is configured to, when the first access network device is a configuration device among the at least two access network devices, generate measurement gap configuration information. Herein, the configuration device is an access network device, that configures a measurement gap for the terminal, as a part of the at least two access network devices, and the measurement gap is used to indicate a period of time during which the terminal performs signal measurement at a frequency point except a present working frequency point.

The processor is further configured to control the transceiver to send the measurement gap configuration information to the terminal.

According to a fourth aspect of the embodiments of the disclosure, a terminal is provided, which includes a processor and a transceiver.

The processor is configured to control the transceiver to receive measurement gap configuration information sent by each of all or part of at least two access network devices.

Herein, the at least two access network devices have established connections with the terminal, the measurement gap configuration information is used for configuring a measurement gap for the terminal and the measurement gap is to indicate a period of time during which the terminal performs signal measurement at a frequency point except a present working frequency point.

The processor is further configured to determine measurement gap configuration information to be reserved from the measurement gap configuration information sent by each of all or part of the at least two access network devices.

BRIEF DESCRIPTION OF DRAWINGS

In order to describe the technical solutions of the embodiments of the disclosure more clearly, the drawings required to be used in descriptions about the embodiments will be simply introduced below. It is apparent that the drawings described below are only some embodiments of the disclosure. Other drawings may further be obtained by those of ordinary skill in the art according to these drawings without creative work.

DETAILED DESCRIPTION

In order to make the purpose, technical solutions and advantages of the disclosure clearer, the implementation modes of the disclosure will further be described below in combination with the drawings in detail.

"Module" mentioned in the disclosure usually refers to a process or instruction stored in a memory and capable of realizing some functions. "Unit" mentioned in the disclosure usually refers to a functional structure which is logically divided. A "unit" may be implemented completely by hardware or implemented by a combination of software and the hardware.

"Multiple" mentioned in the disclosure refers to at least two. "And/or" describes an association relationship between associated objects and represents that three relationships may exist. For example, A and/or B may represent three conditions: i.e., independent existence of A, existence of both A and B and independent existence of B. Character "/" usually represents that previous and next associated objects form an "or" relationship.

Figure 1:
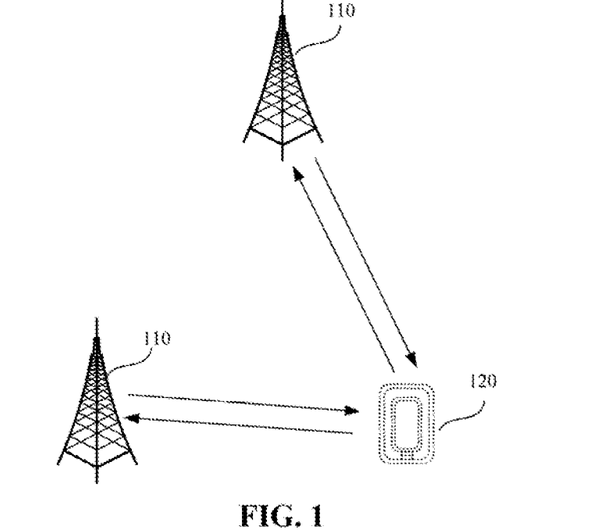
FIG. 1 is a structure diagram of a mobile communication system according to an embodiment of the disclosure.

FIG. 1 is an architecture diagram of a wireless communication system according to an embodiment of the disclosure. The wireless communication system may be a mobile communication system. For example, the wireless communication system may also be the 3rd Generation mobile communication (3G) system; or, the wireless communication system may also be the 4th Generation mobile communication (4G) system, also called a Long Term Evolution (LTE) system; or, the wireless communication system may also be a 5th-Generation (5G) system, also called a New Radio (NR) system. The wireless communication system includes an access network device 110 and a terminal 120.

The access network device 110 may be a Base Station (BS) in the wireless communication system, and the BS may also have different names in different wireless communication systems. For example, the access network device 110 may be a Node B in the 3G system. Or, the access network device 110 may be an Evolved Node B (eNB) in the 4G system. Or, the access network device 110 may also be a gNB adopting a central distributed architecture in the 5G system. The access network device 110, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU. A protocol stack of a Physical (PHY) layer is arranged in the DU. A specific implementation mode of the access network device 110 is not limited in the embodiment of the disclosure.

The access network device 110 establishes a wireless connection with the terminal 120 through a wireless air interface. In different implementation modes, the wireless air interface is a 4G-standard-based wireless air interface; or, the wireless air interface is a 5G-standard-based wireless air interface, for example, the wireless air interface is a new air interface; or, the wireless air interface may also be a wireless air interface based on a next-generation mobile communication network technology standard of 5G.

The terminal 120 may be a device providing voice and/or data connectivity for a user. The terminal 120 may communicate with one or more core networks through a Radio Access Network (RAN). The terminal 120 may be a mobile terminal, for example, a mobile phone (or called a "cell" phone), and a computer with a mobile terminal, for example, a portable, pocket, handheld, computer-embedded or vehicle-mounted mobile device. For example, Station (STA), a subscriber unit, a subscriber STA, a mobile STA, a mobile, a remote STA, an access point, a remote terminal, an access terminal, a user terminal, a user agent, a user device or User Equipment (UE).

The wireless communication system illustrated in FIG. 1 may include multiple access network devices 110 and/or multiple terminals 120, FIG. 1 illustrates two access network devices 110 and one terminal 120 for exemplary description but there are no limits made thereto in the embodiment.

After the terminal 120 establishes a connection with an access network device 110 (namely, the terminal 120 accesses a cell maintained by the access network device 110) and during a connected state of the terminal 120 with the access network device 110, the terminal 120 may further need to perform signal measurement at another frequency point other than a serving frequency point of the currently accessed cell, and this process may be called inter-frequency measurement. Or, when the another frequency point is a frequency point of a system with another system type except a system corresponding to the currently accessed cell, this process may also be called an inter-type measurement. Moreover, the another frequency point may be a frequency point in a communication system corresponding to the access network device 110, or, the another frequency point may also be a frequency point outside the communication system corresponding to the access network device 110.

The communication system may be a system corresponding to a network type of the access network device 110. For example, the communication system may be a 3G, 4G or 5G system. Moreover, the wireless communication system in the embodiment of the disclosure may include at least one communication system, or, the wireless communication system may also be compatible with many different communication systems.

In the embodiment of the disclosure, the terminal 120 supports establishment of connections with the at least two access network devices 110.

The at least two access network devices 110 connected with the terminal 120 may belong to different communication systems. For example, if the number of access network devices connected with a terminal is two, one of the two access network devices connected with the terminal may belong to a 4G system and the other may belong to a 5G system.

Or, the at least two access network devices 110 connected with the terminal 120 may belong to the same communication system. For example, if the number of access network devices connected with a terminal is two, the two access network devices connected with the terminal may both belong to a 4G system, or, the two access network devices connected with the terminal may both belong to a 5G system.

In the embodiment of the disclosure, if the terminal 120 has established connections with the at least two access network devices 110 and when the at least two access network devices 110 configure measurement gaps for the terminal 120, the at least two access network devices 110 determine, by mutual negotiation or according to a predetermined protocol, that one (or a part) of the at least two access network devices 110 configure(s) the measurement gap for the terminal and each of other devices of the at least two access network device 110 does not configure the measurement gap for the terminal, thereby reducing the number of measurement gaps configured when the terminal has established the connections with the at least two access network devices 110, avoiding the terminal frequently interrupting data transmission and switching to another frequency point for signal measurement and improving the efficiency of data transmission of the terminal.

Figure 2:
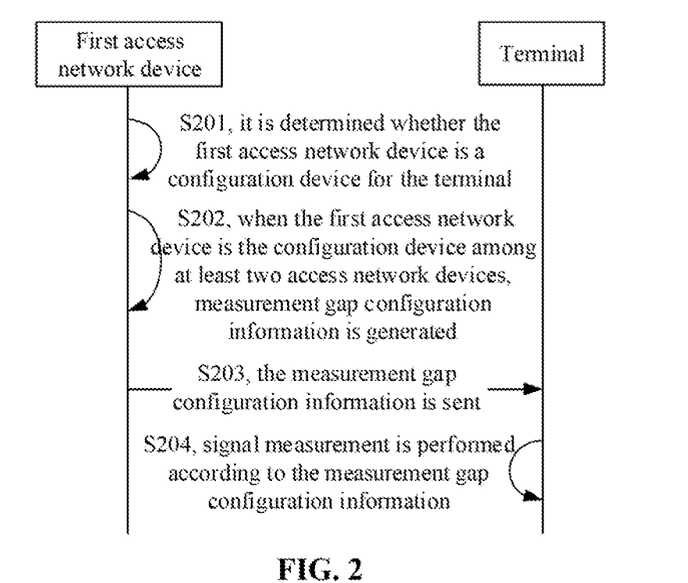
FIG. 2 is a flowchart of a method for configuring a measurement gap according to an embodiment of the disclosure.

Referring to FIG. 2, a flowchart of a method for configuring a measurement gap according to an embodiment of the disclosure is illustrated. In the embodiment, an example is described in which the method for configuring the measurement gap is applied to the mobile communication system illustrated in FIG. 1 and a measurement gap is configured for a terminal that has been connected with at least two access network devices. The method includes the following operations.

In 201, a first access network device determines whether the first access network device is a configuration device for the terminal.

The configuration device is an access network device, that configures a measurement gap for the terminal, as a part of the at least two access network devices. The measurement gap is used to indicate a period of time during which the terminal performs signal measurement at another frequency point other than a present working frequency point.

In the embodiment of the disclosure, when the terminal performs communication at a serving frequency point of a currently accessed cell and if another frequency point other than the serving frequency point of the currently accessed cell is needed to be measured, the access network device corresponding to the currently accessed cell needs to perform measurement configuration of the another frequency point. Specifically, the access network device corresponding to the currently accessed cell may configure a measurement gap for the terminal, and the measurement gap is a period of time during which the terminal performs the signal measurement at the another frequency point.

In addition, in the embodiment of the disclosure, when the terminal has established connections with the at least two access network devices, the at least two access network devices do not all configure measurement gaps for the terminal, but only a part (which may be one or more) of the at least two access network devices need to configure the measurement gaps for the terminal. An access network device that configures the measurement gap for the terminal is the configuration device.

In 202, when the first access network device is the configuration device among the at least two access network devices, the first access network device generates measurement gap configuration information.

When the first access network device determines that the first access network device is the configuration device for the terminal, the first access network device generates the measurement gap configuration information that is used to indicate the measurement gap configured for the terminal.

Optionally, in the embodiment of the disclosure, the measurement gap configuration information may include a measurement frequency point, a measurement period, and a time-domain position of the period of time, during which the terminal performs the signal measurement at the another frequency point other than the serving frequency point of the currently accessed cell, in the measurement period.

For example, if the first access network device needs the terminal to perform inter-frequency measurement on a frequency point f every 80 ms and a measurement gap for inter-frequency measurement is the first 6 ms of each period, the measurement gap configuration information generated by the first access network device includes: the frequency point f, the measurement period 80 ms, and the time-domain position of the measurement gap is the first 6 ms of each period.

In 203, the first access network device sends the measurement gap configuration information to the terminal.

In the embodiment of the disclosure, the first access network device may send the measurement gap configuration information to the terminal through specific signaling or message.

Specifically, for example, the first access network device may send the measurement gap configuration information to the terminal through Radio Resource Control (RRC) signaling.

In 204, the terminal performs signal measurement according to the measurement gap configuration information.

The terminal may perform, after receiving the measurement gap configuration information sent by the first access network device, signal measurement according to the measurement gap configuration information.

For example, if the measurement gap configuration information includes the measurement period and the time-domain position of the period of time, during which the terminal performs the signal measurement at the another frequency point other than the serving frequency point of the currently accessed cell, in the measurement period: and if the measurement frequency point is f, the measurement period is 80 ms and the time-domain position of the measurement gap in each measurement period is the first 6 ms of each period, then the terminal leaves, during signal measurement, the serving frequency point of the currently accessed cell and jumps to the frequency point f for signal measurement within the first 6 ms of every 80 ms; and after the first 6 ms, the terminal jumps back to the serving frequency point of the currently accessed cell for data communication.

Specifically, for example, if a terminal has established connections with an access network device A and with an access network device B and when the terminal needs to perform measurement at another frequency point other than a serving frequency point of a currently accessed cell, only one of the access network device A and the access network device B needs to configure a measurement gap for the terminal. In such a manner, the terminal, in a data transmission process, only needs to perform inter-frequency measurement or inter-type measurement according to the measurement gap configured by the one access network device, and does not perform inter-frequency or inter-type measurement according to a measurement gap configured by each of the two access network devices. Therefore, a frequency and duration of jumping to another frequency point except the serving frequency point of the currently accessed cell are reduced.

From the above, according to the method provided in the embodiment of the disclosure, when the terminal has established connections with the at least two access network devices, the first access network device of the at least two access network devices may send, after determining that the first access network device itself is the configuration device for the terminal, the measurement gap configuration information to the terminal, here, the configuration device is as a part of the at least two access network devices. That is, the terminal only needs to perform inter-frequency or inter-type measurement according to the measurement gap configured by each of the part of the at least two access network devices that have been connected with the terminal, thereby reducing the number of measurement gaps configured when the terminal has established the connections with the at least two access network devices, avoiding the terminal frequently interrupting data transmission and switching to another frequency point for signal measurement and improving the efficiency of data transmission of the terminal.

In the embodiment corresponding to FIG. 2, when it is determined whether the first access network device is the configuration device for the terminal, the first access network device may determine, by negotiating with another access network device connected with the terminal, whether the first access network device is the configuration device for the terminal, or the first access network device may also determine according to a predetermined rule (for example, the predetermined protocol) whether the first access network device is the configuration device for the terminal. Descriptions are made in subsequent embodiments of the disclosure with the two conditions as examples.

Figure 3:
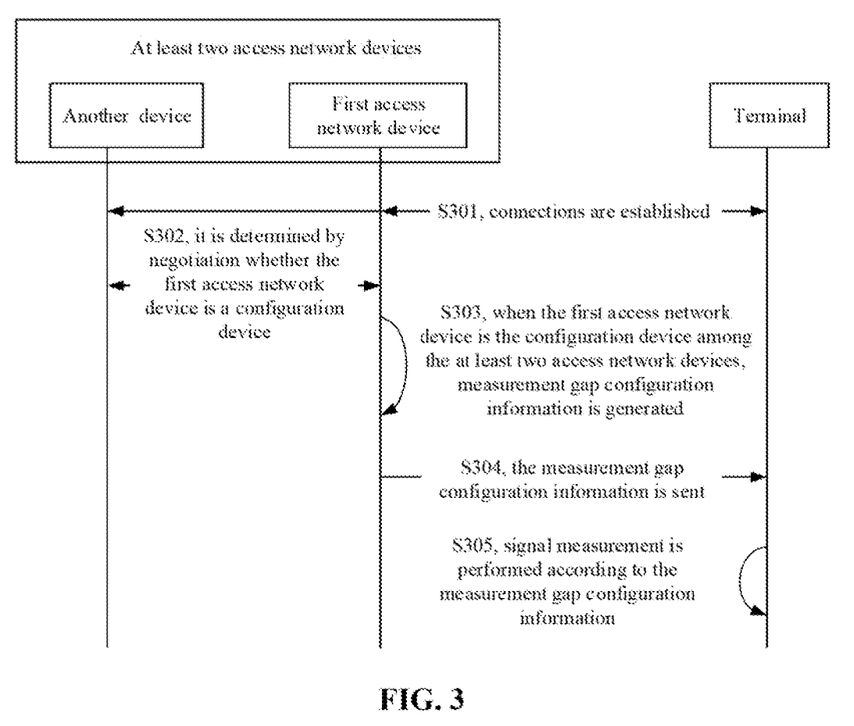
FIG. 3 is a flowchart of a method for configuring a measurement gap according to an embodiment of the disclosure.

Referring to FIG. 3, a flowchart of a method for configuring a measurement gap according to an embodiment of the disclosure is illustrated. In the embodiment, an example is described in which the method for configuring the measurement gap is applied to the mobile communication system illustrated in FIG. 1 and a measurement gap is configured for a terminal by at least two access network devices in a negotiation manner. The method includes the following operations.

In 301, the terminal establishes connections with the at least two access network devices.

In the embodiment of the disclosure, the terminal may establish the connections and perform network communications with the at least two access network devices including a first access network device.

In 302, the first access network device performs network negotiation with another device to determine whether the first access network device is a configuration device.

The another device is a device among remaining devices, except the first access network device, of the at least two access network devices.

The configuration device is an access network device, that configures a measurement gap for the terminal, as a part of the at least two access network devices. The measurement gap is used to indicate a period of time during which the terminal performs signal measurement at a frequency point except a present working frequency point.

Optionally, in the embodiment of the disclosure, the first access network device, when performing network negotiation with the another device, may receive configuration negotiation information sent by the another device. Here, the configuration negotiation information is used for negotiating to determine an access point device that configures a measurement gap for the terminal. The first access network device determines according to the configuration negotiation information whether the first access network device is the configuration device.

Optionally, the configuration negotiation information further includes a configuration indication, and the configuration indication is to indicate whether the another device determines to configure a measurement gap for the terminal. When the first access network device determines according to the configuration negotiation information whether the first access network device is the configuration device, if the configuration indication in the configuration negotiation information received by the first access network device is to indicate that the another device determines to not configure a measurement gap for the terminal, the first access network device may determine that the first access network device is the configuration device; or, if the configuration indication in the configuration negotiation information received by the first access network device is to indicate that the another device determines to configure a measurement gap for the terminal, the first access network device may determine that the first access network device is not the configuration device.

Optionally, the configuration negotiation information may include a frequency point for the measurement gap to be configured for the terminal by the another device.

In 303, when the first access network device is the configuration device among the at least two access network devices, the first access network device generates measurement gap configuration information.

When the first access network device determines that the first access network device is the configuration device for the terminal, the first access network device generates the measurement gap configuration information that is used to indicate the measurement gap configured for the terminal.

Optionally, in the embodiment of the disclosure, the measurement gap configuration information may include: a measurement frequency point, a measurement period, and a time-domain position of a period of time, during which the terminal performs the signal measurement at the frequency point except the serving frequency point of the currently accessed cell, in the measurement period.

In 304, the first access network device sends the measurement gap configuration information to the terminal.

In the embodiment of the disclosure, the first access network device may send the measurement gap configuration information to the terminal through specific signaling or message.

Specifically, for example, the first access network device may send the measurement gap configuration information to the terminal through RRC signaling.

In 305, the terminal performs signal measurement according to the measurement gap configuration information.

The terminal may perform, after receiving the measurement gap configuration information sent by the first access network device, signal measurement according to the measurement gap configuration information.

Specifically, for example, if a terminal has established connections with an access network device A and with an access network device B and when the terminal needs to perform an measurement on a frequency point except a serving frequency point of a currently accessed cell, the access network device A receives configuration negotiation information sent by the access network device B. When the configuration negotiation information indicates that the access network device B determines to configure a measurement gap for the terminal, the access network device A determines that the access network device A is not a configuration device for the terminal, and in such case, the access network device B is the configuration device for the terminal. Or, when the configuration negotiation information indicates that the access network device B determines to configure no measurement gap for the terminal, the access network device A determines that the access network device A is the configuration device for the terminal, and in such case, the access network device B is not the configuration device for the terminal. If the access network device A determines that the access network device A is the configuration device for the terminal, the access network device A configures a measurement gap for the terminal, namely the access network device A generates and sends the measurement gap configuration information to the terminal, and subsequently the terminal only needs to perform inter-frequency or inter-type measurement according to the measurement gap configured by the access network device A. Therefore, a frequency and duration of jumping to another frequency point except the serving frequency point of the presently accessed cell are reduced.

From the above, according to the method provided in the embodiment of the disclosure, when the terminal has established connections with the at least two access network devices, the first access network device of the at least two access network devices may send, after determining by negotiation with the another device that the first access network device is the configuration device for the terminal, the measurement gap configuration information to the terminal, here, the configuration device is as a part of the at least two access network devices. That is, the terminal only needs to perform inter-frequency or inter-type measurement according to the measurement gap configured by each of the part of the at least two access network devices that have been connected with the terminal, thereby reducing the number of measurement gaps configured when the terminal has established the connections with the at least two access network devices, avoiding the terminal frequently interrupting data transmission and switching to another frequency point for signal measurement and improving the efficiency of data transmission of the terminal.

Figure 4:
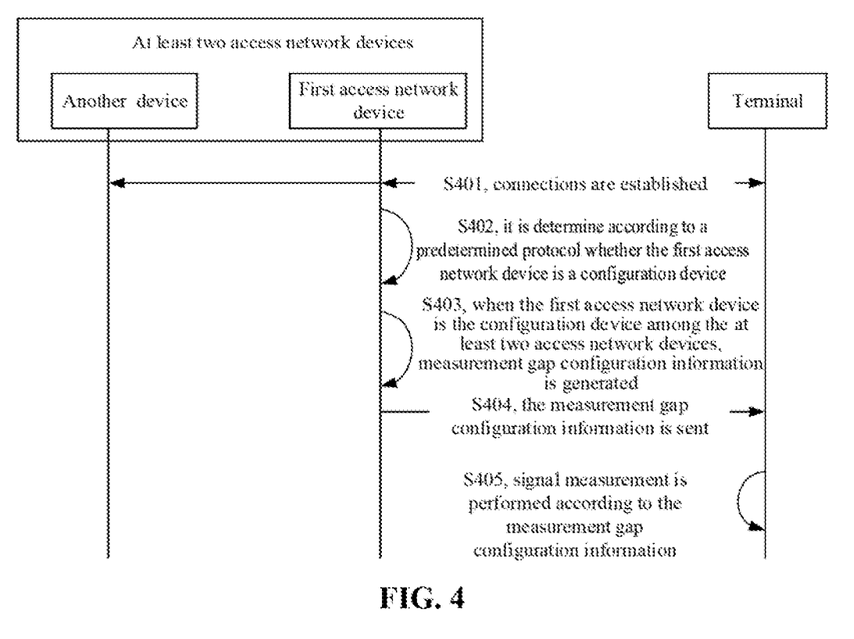
FIG. 4 is a flowchart of a method for configuring a measurement gap according to an embodiment of the disclosure.

Referring to FIG. 4, a flowchart of a method for configuring measurement gap according to an embodiment of the disclosure is illustrated. In the embodiment, an example is described in which the method for configuring the measurement gap is applied to the mobile communication system illustrated in FIG. 1 and a measurement gap is configured for a terminal by at least two access network devices in a predetermined rule. The method includes the following operations.

In 401, the terminal establishes connections with at least two access network devices including a first access network device.

In the embodiment of the disclosure, the terminal may establish connections and perform network communications with the at least two access network devices including the first access network device.

In 402, the first access network device determines whether the first access network device is a configuration device, according to a predetermined protocol.

The configuration device is an access network device, that configures a measurement gap for the terminal, as a part of the at least two access network devices. The measurement gap is used to indicate a period of time during which the terminal performs signal measurement at a frequency point except a present working frequency point.

Optionally, the predetermined protocol may be a preset communication protocol or a private protocol.

Optionally, the predetermined protocol specifies a primary device among the at least two access network devices as the configuration device for the terminal. When the first access network device determines whether the first access network device is the configuration device for the terminal, the first access network device may acquire a relationship between the at least two access network devices connected with the terminal, and the relationship between the at least two access network devices may be a relationship that indicates the primary device and secondary device among the at least two access network devices. If the relationship between the at least two access network devices indicates that the first access network device is the primary device, the first access network device may determine that the first access network device is the configuration device for the terminal.

Optionally, the predetermined protocol specifies, as the configuration device, an access network device, that configures the maximum number of measurement gaps for the terminal, of the at least two access network devices. The first access network device may acquire, when determining whether the first access network device is the configuration device for the terminal, the respective number of measurement gaps configured for the terminal by each of the at least two access network devices connected with the terminal, and when the number of measurement gaps configured for the terminal by the first access network device is a maximum value, the first access network device may determine that the first access network device is the configuration device for the terminal.

In 403, when the first access network device is the configuration device among the at least two access network devices, the first access network device generates measurement gap configuration information.

When the first access network device determines that the first access network device is the configuration device for the terminal, the first access network device generates the measurement gap configuration information that is used to indicate the measurement gap configured for the terminal.

Optionally, in the embodiment of the disclosure, the measurement gap configuration information may include a measurement frequency point, a measurement period, and a time-domain position of the period of time, during which the terminal performs signal measurement at the frequency point except the serving frequency point of the currently accessed cell, in the measurement period.

In 404, the first access network device sends the measurement gap configuration information to the terminal.

In the embodiment of the disclosure, the first access network device may send the measurement gap configuration information to the terminal through specific signaling or message.

Specifically, for example, the first access network device may send the measurement gap configuration information to the terminal through RRC signaling.

In 405, the terminal performs signal measurement according to the measurement gap configuration information.

The terminal may perform, after receiving the measurement gap configuration information sent by the first access network device, signal measurement according to the measurement gap configuration information.

Specifically, for example, if a terminal has established connections with an access network device A and with an access network device B and when the terminal needs to perform a measurement on a frequency point except a serving frequency point of a currently accessed cell, each of the access network device A and the access network device B determines, according to a predetermined protocol, whether it is a configuration device for the terminal. The predetermined protocol is only used to determine one of the access network device A and the access network device B as the configuration device for the terminal. If the access network device A determines that the access network device A is the configuration device for the terminal, the access network device A configures a measurement gap for the terminal, namely the access network device A generates and sends measurement gap configuration information to the terminal, and subsequently the terminal only needs to perform inter-frequency or inter-type measurement according to the measurement gap configured by the access network device A. Therefore, a frequency and duration of jumping to another frequency point except the serving frequency point of the currently accessed cell are reduced.

From the above, according to the method provided in the embodiment of the disclosure, when the terminal has established connections with the at least two access network devices, the first access network device of the at least two access network devices may send, after determining according to the predetermined protocol that the first access network device is the configuration device for the terminal, the measurement gap configuration information to the terminal, here, the configuration device is as a part of the at least two access network devices. That is, the terminal only needs to perform inter-frequency or inter-type measurement according to the measurement gap configured by each of the part of the at least two access network devices that have been connected with the terminal, thereby reducing the number of measurement gaps configured when the terminal has establishes the connections with the at least two access network devices, avoiding the terminal frequently interrupting data transmission and switching to another frequency point for signal measurement, and improving the efficiency of data transmission of the terminal.

In each embodiment of the disclosure, only when frequency points for measurement gaps to be configured for the terminal by the at least two access network devices that have established the connections with the terminal meet a certain condition, a measurement gap is needed to be configured for the terminal. Specifically, for example, taking the first access network device of the at least two access network devices an example, when a first predetermined condition is met and the first access network device is the configuration device for the terminal, the first access network device may generate the measurement gap configuration information.

The first predetermined condition may include, but not limited to, one of the following three conditions.

A first condition: a frequency point for a measurement gap to be configured for the terminal by the first access network device and a frequency point for a measurement gap to be configured for the terminal by another device are the same frequency point, and the frequency point is not a serving frequency point for the first access network device and not a serving frequency point for the another device.

In the embodiment of the disclosure, the measurement gap to be configured for the terminal by an access network device is a measurement gap that the access network device intends to configure for the terminal, but is not finalized to be configured.

For example, the terminal has established the connections with the access network device A and with the access network device B, both the access network device A and the access network device B both intend to configure the terminal to measure a frequency point f1, the frequency point f1 is not a serving frequency point for the access network device A and is not a serving frequency point for the access network device B, and when a measurement gap is needed to be configured, the access network device A and the access network device B may negotiate to determine that which one of the access network devices A and B configures the measurement gap for the terminal, or, may determine, according to a predetermined protocol, that which one of the access network devices A and B configures the measurement gap for the terminal.

A second condition: a frequency point for a measurement gap to be configured for the terminal by the first access network device is different from a frequency point for a measurement gap to be configured for the terminal by another device, the frequency point for the measurement gap to be configured for the terminal by the first access network device and the frequency point for the measurement gap to be configured for the terminal by the another device are not serving frequency points for the first access network device and the another device, and the frequency point for the measurement gap to be configured for the terminal by the first access network device and the frequency point for the measurement gap to be configured for the terminal by the another device belong to a communication system corresponding to the first access network device or belong to a communication system corresponding to the another device.

For example, the terminal has established the connections with the access network device A and with the access network device B, the access network device A intends to configure the terminal to measure a certain frequency point f1, and the access network device B intends to configure the terminal to measure a certain frequency point 2, the two frequency points 1 and 2 are not the serving frequency points for the access network device A and the access network device B, and the two frequency points f1 and f2 belong to a communication system of the access network device A or belong to a communication system of the access network device B. When the measurement gap is needed to be configured for the terminal, the access network device A and the access network device B may negotiate to determine that which one of the access network devices A and B configures the measurement gap for the terminal, or, may determine, according to a predetermined protocol, that which one of the access network devices A and B configures the measurement gap for the terminal.

A third condition: a frequency point for a measurement gap to be configured for the terminal by the first access network device is different from a frequency point for a measurement gap to be configured for the terminal by another device, the frequency point for the measurement gap to be configured for the terminal by the first access network device and the frequency point for the measurement gap to be configured y for the terminal by the another device are not serving frequency points for the first access network device and the another device, and the frequency point for the measurement gap to be configured for the terminal by the first access network device and the frequency point for the measurement gap to be configured for the terminal by the another device belong to different systems of the communication systems corresponding to the first access network device and the another device.

For example, the terminal has established the connections with the access network device A and with the access network device B, the access network device A configures the terminal to measure a certain frequency point f1, and the access network device B configures the terminal to measure a certain frequency point 2, the two frequency points f1 and 2 are not the serving frequency points for the access network device A and the access network device B, and the two frequency points f1 and 12 belong to different communication systems. When the measurement gap is needed to be configured, the access network device A and the access network device B may negotiate to determine that which one of the access network devices A and B configures the measurement gap for the terminal, or, determine, according to the predetermined protocol, that which one of the access network devices A and B configures the measurement gap for the terminal.

In another possible implementation mode, when the frequency points for the measurement gaps to be configured for the terminal by the at least two access network devices that have established the connections with the terminal meet a certain condition, there may also exist the situation that the at least two access network devices do not configure the measurement gaps for the terminal. Specifically, taking the first access network device of the at least two access network devices an example, when a second predetermined condition is met, the first access network device determines to not generate measurement gap configuration information.

The second predetermined condition includes that: a frequency point for a measurement gap to be configured for the terminal by another device is a serving frequency point for the first access network device; or, a frequency point for a measurement gap to be configured for the terminal by the first access network device is a serving frequency point for another device.

For example, the terminal has established the connections with the access network device A and with the access network device B, the access network device A configures the terminal to measure a certain frequency point f1, the frequency point f1 is a serving frequency point for the access network device B. and the access network device A and the access network device B may negotiate to determine that the measurement gap is not needed to be configured for the terminal.

In another possible implementation mode, when the at least two access network devices connected with the terminal fail to determine the configuration device, each of the at least two access network devices may generate measurement gap configuration information and send the generated measurement gap configuration information to the terminal.

In another possible implementation mode, after the terminal has established the connections with the at least two access network devices and when the terminal receives the measurement gap configuration information sent by each of all or part of the at least two access network devices, the terminal may determine, from the received measurement gap configuration information, measurement gap configuration information to be reserved.

Figure 5:
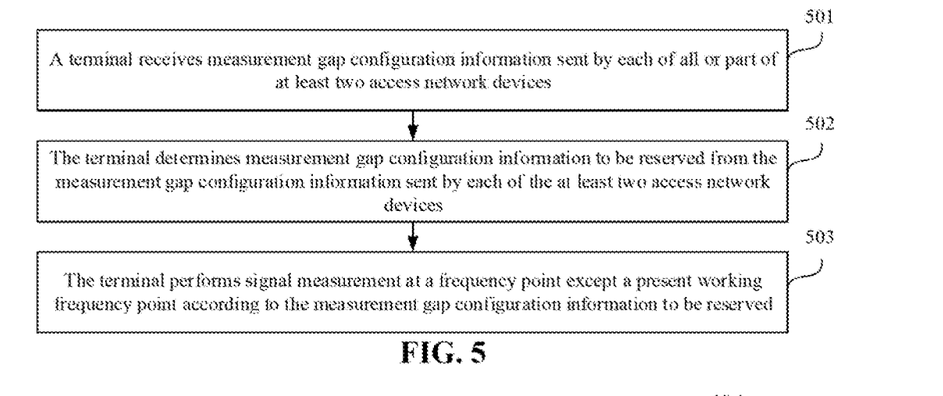
FIG. 5 is a flowchart of a method for configuring a measurement gap according to an embodiment of the disclosure.

Referring to FIG. 5, a flowchart of a method for configuring measurement gap according to an embodiment of the disclosure is illustrated. In the embodiment, an example is described in which the method for configuring the measurement gap is applied to the mobile communication system illustrated in FIG. 1 and a measurement gap is configured for a terminal by at least two access network devices in a predetermined rule. The method includes the following operations.

In 501, a terminal receives measurement gap configuration information sent by each of all or part of the at least two access network devices.

The at least two access network devices have established connections with the terminal, the measurement gap configuration information is used in configuring a measurement gap for the terminal, and the measurement gap is used to indicate a period of time during which the terminal performs signal measurement at a frequency point except a present working frequency point.

When the at least two access network devices connected with the terminal fail to determine a configuration device, each of the at least two access network devices may generate the measurement gap configuration information and send the generated measurement gap configuration information to the terminal, in such case, for reducing the number or frequency of the inter-frequency or inter-system measurements by the terminal, the terminal may determine measurement gap configuration information to be reserved from the received measurement gap configuration information and discard the remaining measurement gap configuration information.

Or, when the number of configuration devices, that configure measurement gaps for the terminal, among the at least two access network devices is two or more, the terminal may also receive two or more pieces of measurement gap configuration information even though the at least two access network devices successfully determine the configuration devices. In such case, for further reducing the number or frequency of the inter-frequency or inter-system measurements by the terminal, the terminal may also determine measurement gap configuration information to be reserved from the received measurement gap configuration information and discard the remaining measurement gap configuration information.

Or, even though the terminal receives the measurement gap configuration information sent by only one access network device and if the terminal does not need to perform inter-frequency or inter-type measurement according to the measurement gap configuration information, the terminal may also determine to discard the measurement gap configuration information, namely it is determined that the number of the measurement gap configuration information to be reserved is 0.

In 502, the terminal determines measurement gap configuration information to be reserved from the measurement gap configuration information sent by each of the at least two access network devices.

Optionally, the terminal determines, as the measurement gap configuration information to be reserved, the measurement gap configuration information sent by a primary connection device among the at least two access network devices; or the terminal determines, as the measurement gap configuration information to be reserved, the measurement gap configuration information sent by an access network device, that configures the maximum number of measurement gaps for the terminal, of the at least two access network devices.

In 503, the terminal performs signal measurement at a frequency point except a present working frequency point according to the measurement gap configuration information to be reserved.

From the above, according to the method provided in the embodiment of the disclosure, when the terminal has established the connections with the at least two access network devices, the terminal may determine, after receiving the measurement gap configuration information sent by all or part of the at least two access network devices, the measurement gap configuration information to be reserved from the received measurement gap configuration information and perform measurement only according to the measurement gap configuration information to be reserved, thereby reducing the number or frequency of the inter-frequency or inter-type measurements by the terminal, avoiding the terminal frequently interrupting data transmission and switching to another frequency point for signal measurement, and improving the efficiency of data transmission of the terminal.

The below is the device embodiment of the embodiments of the disclosure, and parts which are not elaborated in the device embodiments may refer to technical details disclosed in the method embodiments.

Figure 6:
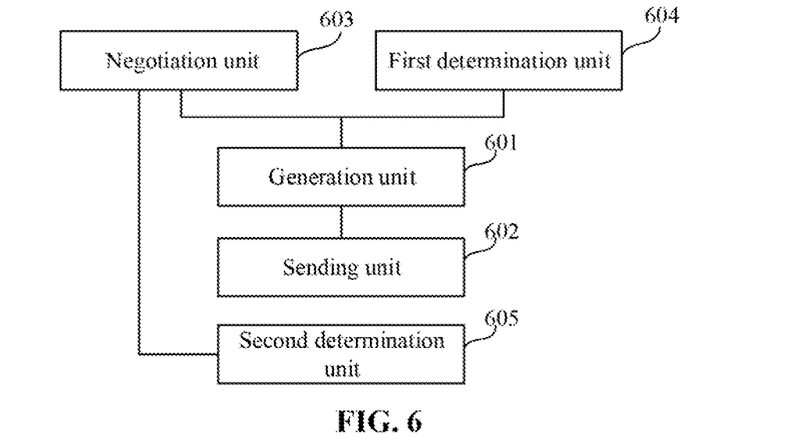
FIG. 6 is a structure diagram of a device for configuring a measurement gap according to an embodiment of the disclosure.

Referring to FIG. 6, a structure diagram of a device for configuring a measurement gap according to an embodiment of the disclosure is illustrated. The device for configuring the measurement gap may be implemented into all or part of an access network device through software, hardware and a combination thereof. The device for configuring the measurement gap includes a generation unit 601 and a sending unit 602.

The generation unit 601 is configured to execute the related operations, which are performed by the first access network device, of generating the measurement gap configuration information in FIG. 2 to FIG. 4.

The sending unit 602 is configured to execute the related operations, which is performed by the first access network device, of sending the measurement gap configuration information in FIG. 2 to FIG. 4.

The device for configuring the measurement gap may further include a negotiation unit 603, a first determination unit 604 and a second determination unit 605.

The negotiation unit 603 is configured to execute the related operations, which are performed by the first access network device, of determining whether the first access network device is the configuration device by negotiation in FIG. 2 to FIG. 4.

The first determination unit 604 is configured to execute the related operations, which are performed by the first access network device, of determining whether the first access network device is the configuration device according to the predetermined protocol in FIG. 2 to FIG. 4.

The second determination unit 605 is configured to execute the related operations, which are performed by the first access network device, of determining to not generate measurement gap configuration information in FIG. 2 to FIG. 4.

Figure 7:
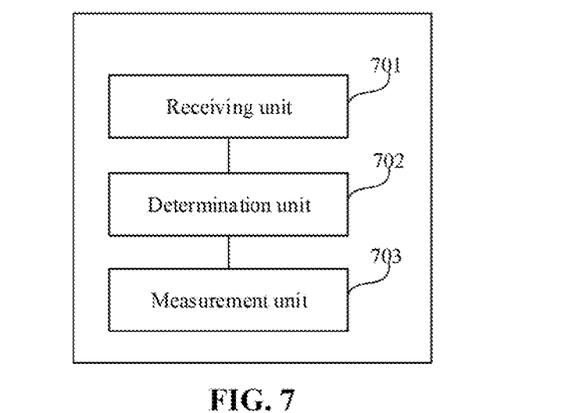
FIG. 7 is a structure diagram of a device for configuring a measurement gap according to an embodiment of the disclosure.

Referring to FIG. 7, a structure diagram of a device for configuring a measurement gap according to an embodiment of the disclosure is illustrated. The device for configuring the measurement gap may be implemented into all or part of a terminal through software, hardware and a combination thereof. The device for configuring a measurement gap includes a receiving unit 701 and a determination unit 702.

The receiving unit 701 is configured to execute the related operations, which are performed by the terminal, of receiving the measurement gap configuration information in FIG. 2 to FIG. 5.

The determination unit 702 is configured to execute the related operations, which are performed by the terminal, of determining the measurement gap configuration information to be reserved in FIG. 2 to FIG. 5.

Optionally, the measurement gap configuration apparatus may further include a measurement unit 703.

The measurement unit 703 is configured to execute the related operations, which are performed by the terminal, of performing signal measurement at the another frequency point except the present working frequency point in FIG. 2 to FIG. 5.

Figure 8:
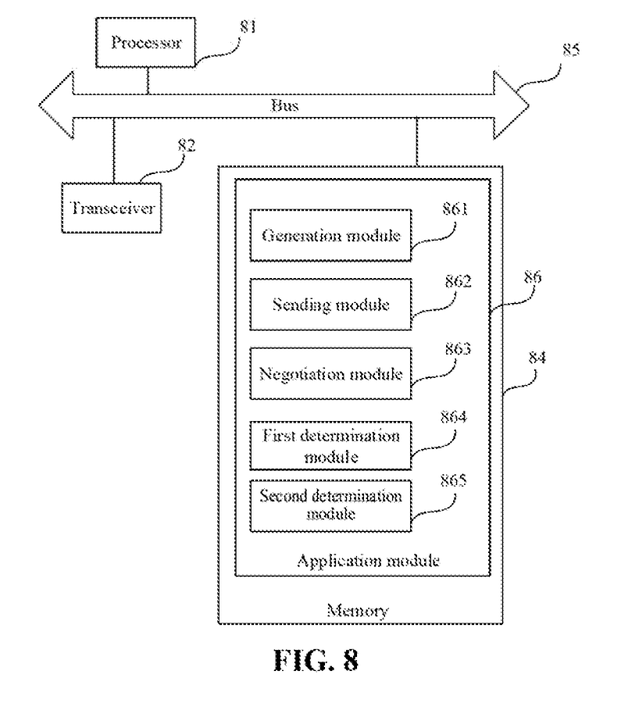
FIG. 8 is a structure diagram of an access network device according to an embodiment of the disclosure.

Referring to FIG. 8, a structure diagram of an access network device according to an exemplary embodiment of the disclosure is illustrated. The access network device includes a processor 81, a transceiver 82, a memory 84 and a bus 85.

The processor 81 includes one or more processing cores, and the processor 81 runs software programs and modules, thereby executing various function applications and information processing.

The transceiver 82 may be implemented into a communication component, the communication component may be a communication chip, and the communication chip may include a receiving module, a transmission module, a modem module and the like, and is configured to modulate and/or demodulate information and receive or send the information through a wireless signal.

The memory 84 is connected with the processor 81 through the bus 85.

The memory 84 may be configured to store the software programs and the modules.

The memory 84 may store an application module 86 for at least one function. The application module 86 may include a generation module 861 and a sending module 862. Optionally, the application module 86 may further include a negotiation module 863, a first determination module 864 and a second determination module 865.

The processor 81 is configured to execute the generation module 861 to realize a function of the related operation of generating the measurement gap configuration information in each method embodiment. The processor 81 is configured to execute the sending module 862 to realize a function of the related operation of sending the measurement gap configuration information in each method embodiment. The processor 81 is configured to execute the negotiation module 863 to realize a function of the related operation of determining by negotiation whether the first access network device is the configuration device in each method embodiment. The processor 81 is configured to execute the first determination module 864 to realize a function of the related operation of determining whether the first access network device is the configuration device according to the predetermined protocol in each method embodiment. The processor 81 is configured to execute the second determination module 865 to realize a function of the related operation of determining to not generate measurement gap configuration information in each method embodiment.

In addition, the memory 84 may be implemented by a volatile or nonvolatile storage device of any type or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

Figure 9:
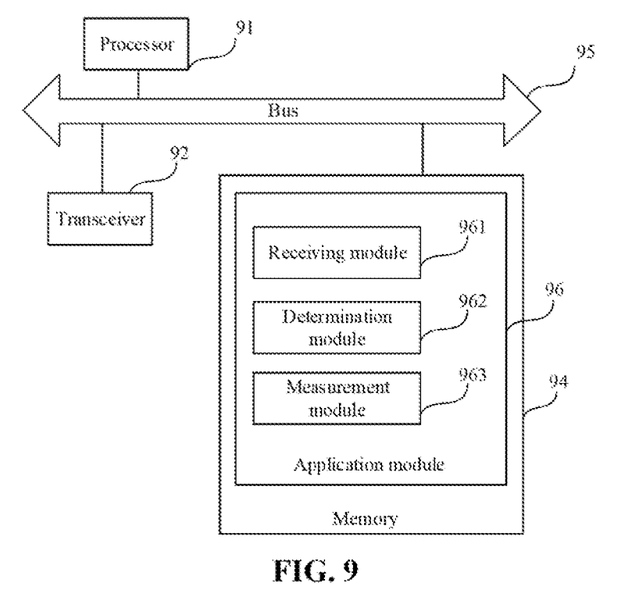
FIG. 9 is a structure diagram of a terminal according to an embodiment of the disclosure.

Referring to FIG. 9, a structure diagram of a terminal according to an exemplary embodiment of the disclosure is illustrated. The terminal includes a processor 91, a transceiver 92, a memory 94 and a bus 95.

The processor 91 includes one or more processing cores, and the processor 91 runs software programs and modules, thereby executing various function applications and information processing.

The transceiver 92 may be implemented into a communication component, the communication component may be a communication chip, and the communication chip may include a receiving module, a transmission module, a modem module and the like, and is configured to modulate and/or demodulate information and receive or send the information through a wireless signal.

The memory 94 is connected with the processor 91 through the bus 95.

The memory 94 may be configured to store the software programs and the modules.

The memory 94 may store an application module 96 for at least one function. The application module 96 may include a receiving module 91 and a determination module 962. Optionally, the application module 96 may further include a measurement module 963.

The processor 91 is configured to execute the receiving module 961 to realize a function of the related operation of receiving the measurement gap configuration information in each method embodiment. The processor 91 is configured to execute the determination module 962 to realize a function of the related operation of determining the measurement gap configuration information to be reserved in each method embodiment. The processor 91 is configured to execute the measurement module 963 to realize a function of the related operation of performing signal measurement at another frequency point except the present working frequency point in each method embodiment.

In addition, the memory 94 may be implemented by a volatile or nonvolatile storage device of any type or a combination thereof, for example, an SRAM, an EEPROM, an EPROM, a PROM, a ROM, a magnetic memory, a flash memory, a magnetic disk or an optical disk.

An embodiment of the disclosure also provides a system for configuring a measurement gap, which may include a terminal and an access network device.

The access network device includes the device for configuring the measurement gap illustrated in FIG. 6.

The terminal may include the device for configuring the measurement gap illustrated in FIG. 7.

An embodiment of the disclosure also provides a system for configuring a measurement gap, which may include a terminal and an access network device.

The access network device may be the access network device illustrated in FIG. 8.

The terminal may include the terminal illustrated in FIG. 9.

An embodiment of the disclosure also provides a computer-readable storage medium, which stores a computer program (instruction), the program (instruction) is executed by a processor to implement the operations performed by the access network device in any embodiment in FIG. 2 to FIG. 5, or, the program (instruction) is executed by the processor to implement the operations performed by the terminal in any embodiment in FIG. 2 to FIG. 5.

Additional Embodiments

A first embodiment of the disclosure provides a method for configuring a measurement gap. The method may be used in a first access network device of at least two access network devices that have established connections with a terminal, and the method includes the following operations.

When the first access network device is a configuration device among the at least two access network devices, the first access network device generates measurement gap configuration information. Here, the configuration device is an access network device, that configures a measurement gap for the terminal, as a part of the at least two of devices, and the measurement gap is used to indicate a period of time during which the terminal performs signal measurement at a frequency point except a present working frequency point.

The first access network device sends the measurement gap configuration information to the terminal.

According to the first embodiment, the method may further include the following operation.

The first access network device performs network negotiation with another device, except the first access network device, of the at least two access network devices to determine whether the first access network device is the configuration device.

According to the first embodiment, the operation that the first access network device performs the network negotiation with the another device, except the first access network device, of the at least two access network devices to determine whether the first access network device is the configuration device may include the following operations.

The first access network device receives configuration negotiation information sent by the another device. Here, the configuration negotiation information is used for negotiating to determine an access point device that configures a measurement gap for the terminal.

The first access network device determines, according to the configuration negotiation information, whether the first access network device is the configuration device.

According to the first embodiment, the configuration negotiation information may include a frequency point for a measurement gap to be configured for the terminal by the another device.

According to the first embodiment, the configuration negotiation information may further include a configuration indication, and the configuration indication is to indicate whether the another device determines to configure a measurement gap for the terminal.

According to the first embodiment, the method may further include the following operation.

The first access network device determines, according to a predetermined protocol, whether the first access network device is the configuration device.

According to the first embodiment, the operation that the first access network device generates the measurement gap configuration information may include the following operations.

The first access network device generates the measurement gap configuration information when a first predetermined condition is met.

The first predetermined condition may include the following conditions.

A frequency point for a measurement gap to be configured for the terminal by the first access network device is as same as a frequency point for a measurement gap to be configured for the terminal by another device, and the frequency point is not a serving frequency point for the first access network device and a serving frequency point for the another device.

Or, a frequency point for a measurement gap to be configured for the terminal by the first access network device is different from a frequency point for a measurement gap to be configured for the terminal by another device, the frequency point for the measurement gap to be configured for the terminal by the first access network device and the frequency point for the measurement gap to be configured for the terminal by the another device are not service frequency points for the first access network device and the another device, and the frequency point for the measurement gap to be configured for the terminal by the first access network device and the frequency point for the measurement gap to be configured for the terminal by the another device belong to a communication system corresponding to the first access network device or belong to a communication system corresponding to the another device.

Or, a frequency point for a measurement gap to be configured for the terminal by the first access network device is different from a frequency point for a measurement gap to be configured for the terminal by another device, the frequency point for the measurement gap to be configured for the terminal by the first access network device and the frequency point for the measurement gap to be configured for the terminal by the another device are not service frequency points for the first access network device and the another device, and the frequency point for the measurement gap to be configured for the terminal by the first access network device and the frequency point for the measurement gap to be configured for the terminal by the another device belong to different systems of the communication systems corresponding to the first access network device and the another device.

According to the first embodiment, the method may further include the following operations.

The first access network device determines to not generate measurement gap configuration information when a second predetermined condition is met.

The second predetermined condition may include the following conditions.

A frequency point for a measurement gap to be configured for the terminal by another device is a serving frequency point for the first access network device.

Or, a frequency point for a measurement gap to be configured for the terminal by the first access network device is a serving frequency point for another device.

According to the first embodiment, the measurement gap configuration information may include: a measurement frequency point, a measurement period, and a time-domain position of the period of time, during which the terminal performs the signal measurement at the frequency point in the measurement period.

According to the first embodiment, the at least two access network devices may belong to different communication systems.

Or, the at least two access network devices may belong to a same communication system.

A second embodiment of the disclosure provides a method for configuring a measurement gap, which may include the following operations.

A terminal receives measurement gap configuration information sent by each of all or part of at least two access network devices. Here, the at least two access network devices have established connections with the terminal, the measurement gap configuration information is used for configuring a measurement gap for the terminal, and the measurement gap is used to indicate a period of time during which the terminal performs signal measurement at a frequency point except a present working frequency point.

The terminal determines measurement gap configuration information to be reserved from the measurement gap configuration information sent by each of all or part of the at least two access network devices.

According to the second embodiment, the method may further include the following operation.

The terminal performs the signal measurement at the frequency point except the present working frequency point according to the measurement gap configuration information to be reserved.

According to the second embodiment, the operation that the terminal determines the measurement gap configuration information to be reserved from the measurement gap configuration information sent by each of all or part of the at least two access network devices may include the following operations.

The terminal determines, as the measurement gap configuration information to be reserved, the measurement gap configuration information sent by a primary connection device among the at least two access network devices.

Or, the terminal determines, as the measurement gap configuration information to be reserved, the measurement gap configuration information sent by an access network device of the at least two access network devices that configures a maximum number of measurement gaps for the terminal.

According to the second embodiment, the measurement gap configuration information may include: a measurement frequency point, a measurement period, and a time-domain position of the period of time, during which the terminal performs the signal measurement at the frequency point, in the measurement period.

According to the second embodiment, the at least two access network devices may belong to different communication systems.

Or, the at least two access network devices may belong to a same communication system.

A third embodiment of the disclosure provides a device for configuring a measurement gap, the device includes at least one unit, and the at least one unit is configured to implement the method for configuring the measurement gap provided in the abovementioned first embodiment.

A fourth embodiment of the disclosure provides a device for configuring a measurement gap. The device includes at least one unit, and the at least one unit is configured to implement the method for configuring measurement gap provided in the abovementioned second embodiment.

A fifth embodiment of the disclosure provides an access network device, which includes a processor, a memory and a transceiver. The memory is configured to store one or more instructions, the instructions are executed by the processor, and the processor is configured to control the transceiver to implement the method for configuring the measurement gap provided in the abovementioned first embodiment.

A sixth embodiment of the disclosure provides a terminal, which includes a processor, a memory and a transceiver. The memory is configured to store one or more instructions, the instructions are executed by the processor, and the processor is configured to control the transceiver to implement the method for configuring the measurement gap provided in the abovementioned second embodiment.

A seventh embodiment of the disclosure provides a computer-readable storage medium, which stores a computer program (instruction), the program (instruction) is executed by a processor to implement the operations of the method for configuring the measurement gap provided in the abovementioned first embodiment, or the program (instruction) is executed by the processor to implement the operations of the method for configuring the measurement gap provided in the abovementioned second embodiment.

An eighth embodiment of the disclosure provides a system for configuring a measurement gap, which may include a terminal and an access network device. The access network device may be an access network device including the device for configuring the measurement gap provided in the abovementioned third embodiment, and the terminal may be a terminal including the device for configuring the measurement gap provided in the abovementioned fourth embodiment.

A ninth aspect of the embodiments of the disclosure provides a system for configuring a measurement gap, which may include a terminal and an access network device. The access network device may be the access network device provided in the abovementioned fifth embodiment, and the terminal may be the terminal provided in the abovementioned sixth embodiment.

The additional embodiments provide the following beneficial effects.

When a terminal has established connections with at least two access network devices, a first access network device of the at least two access network devices may send, after determining that the first access network device itself is a configuration device for the terminal, measurement gap configuration information to the terminal, the configuration device is as a part of the at least two access network devices. That is, the terminal only needs to perform inter-frequency or inter-type measurement according to the measurement gap configured by each of the part of the at least two access network devices connected with the terminal, thereby reducing the number of measurement gaps configured when the terminal has established the connections with the at least two access network devices, avoiding the terminal frequently interrupting data transmission and switching to another frequency point for signal measurement, and improving the efficiency of data transmission of the terminal.

Those skilled in the art may realize that in one or more abovementioned examples, the functions described in the embodiments of the disclosure may be realized through hardware, software, firmware or any combination thereof. When being realized through the software, these functions may be stored in a computer-readable medium or transmitted as one or more instructions or codes in the computer-readable medium. The computer-readable medium includes a computer storage medium and a communication medium, and the communication medium includes any medium for transmitting a computer program from one place to another place. The storage medium may be any available medium accessible for a universal or dedicated computer.

The above is only the preferred embodiment of the disclosure and is not intended to limit the disclosure. Any modifications, equivalent replacements, improvements and the like made within the spirit and principle of the disclosure shall fall within the scope of protection of the disclosure.

The invention claimed is:

1. A method for configuring a measurement gap, the method being used in a first access network device among at least two access network devices that have established connections with a terminal, and the method comprising:
    performing, by the first access network device, network negotiation with a device, other than the first access network device, among the at least two access network devices to determine whether the first access network device is a configuration device;
    when the first access network device is the configuration device, generating, by the first access network device, measurement gap configuration information, wherein the measurement gap configuration information is used for configuring a measurement gap for the terminal, and the measurement gap is used to indicate a period of time during which the terminal performs signal measurement at a frequency point other than any serving frequency point for the at least two access network devices, and wherein the at least two access network devices belong to a same communication system which comprises a Fourth Generation (4G) system or a Fifth Generation (5G) system, or the at least two access network devices belong to different communication systems which comprise a Fourth Generation (4G) system and a Fifth Generation (5G) system; and
    sending, by the first access network device, the measurement gap configuration information directly or indirectly to the terminal through Radio Resource Control (RRC) signaling.

2. The method of claim 1, wherein performing, by the first access network device, the network negotiation with the device, other than the first access network device, among the at least two access network devices to determine whether the first access network device is the configuration device comprises:
    receiving, by the first access network device, configuration negotiation information sent by the device, wherein the configuration negotiation information is used for negotiating to determine an access point device that configures a measurement gap for the terminal; and
    determining, by the first access network device according to the configuration negotiation information, whether the first access network device is the configuration device.

3. The method of claim 2, wherein the configuration negotiation information comprises a frequency point for a measurement gap to be configured for the terminal by the device.

4. The method of claim 2, wherein the configuration negotiation information comprises a configuration indication, the configuration indication is to indicate whether the device determines to configure a measurement gap for the terminal.

5. The method of claim 1, wherein generating, by the first access network device, the measurement gap configuration information comprises:

when a first predetermined condition is met, generating, by the first access network device, the measurement gap configuration information, wherein
the first predetermined condition comprises one of:
a frequency point for a measurement gap to be configured for the terminal by the first access network device is as same as a frequency point for a measurement gap to be configured for the terminal by the device, and the frequency point is not a serving frequency point for the first access network device and a serving frequency point for the device;
a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to a communication system corresponding to the first access network device or belong to a communication system corresponding to the device; or
a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to different systems among communication systems corresponding to the first access network device and the device.

6. The method of claim 1, further comprising:
when a second predetermined condition is met, determining, by the first access network device, to not generate measurement gap configuration information, wherein
the second predetermined condition comprises one of:
a frequency point for a measurement gap to be configured for the terminal by the device is a serving frequency point for the first access network device; or
a frequency point for a measurement gap to be configured for the terminal by the first access network device is a serving frequency point for the device.

7. The method of claim 1, wherein the measurement gap configuration information comprises:
a measurement frequency point, a measurement period, and a time-domain position of the period of time, during which the terminal performs signal measurement at the frequency point, in the measurement period.

8. A method for configuring a measurement gap, comprising:
receiving, by a terminal, through Radio Resource Control (RRC) signaling, measurement gap configuration information directly or indirectly from a first access network device among at least two access network devices, the first access network device being determined as a configuration device through network negotiation between the first access network device and a device, other than the first access network device, among the at wo access network devices,
wherein the at least two access network devices have established connections with the terminal, the measurement gap configuration information is used for configuring a measurement gap for the terminal, and the measurement gap is used to indicate a period of time during which the terminal performs signal measurement at a frequency point other than any serving frequency point for the at least two access network devices, and
wherein the at least two access network devices belong to a same communication system which comprises a Fourth Generation (4G) system or a Fifth Generation (5G) system, or the at least two access network devices belong to different communication systems which comprise a Fourth Generation (4G) system and a Fifth Generation (5G) system.

9. The method of claim 8, further comprising:
performing, by the terminal, the signal measurement at the frequency point according to the measurement gap configuration information.

10. The method of claim 8, wherein the first access network device is determined as the configuration device based on configuration negotiation information received from the device, wherein the configuration negotiation information is used for negotiating to determine an access point device that configures a measurement gap for the terminal.

11. The method of claim 10, wherein the configuration negotiation information comprises a frequency point for a measurement gap to be configured for the terminal by the device.

12. The method of claim 10, wherein the configuration negotiation information comprises a configuration indication, the configuration indication is to indicate whether the device determines to configure a measurement gap for the terminal.

13. The method of claim 8, wherein receiving, by the terminal, the measurement gap configuration information directly or indirectly from the first access network device comprises:
receiving, by the terminal directly or indirectly from the first access network device, the measurement gap configuration information generated when a first predetermined condition is met,
wherein the first predetermined condition comprises one of:
a frequency point for a measurement gap to be configured for the terminal by the first access network device is as same as a frequency point for a measurement gap to be configured for the terminal by the device, and the frequency point is not a serving frequency point for the first access network device and a serving frequency point for the device;
a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to a communication system corresponding to the first access network device or belong to a communication system corresponding to the device; or a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to different systems among the communication systems corresponding to the first access network device and the device.

14. The method of claim 8, wherein the measurement gap configuration information comprises:
a measurement frequency point, a measurement period, and a time-domain position of the period of time, during which the terminal performs the signal measurement at the frequency point, in the measurement period.

15. An access network device, the access network device being a first access network device among at least two access network devices that have established connections with a terminal, and the first access network device comprising a processor and a transceiver, wherein
the processor is configured to:
control the transceiver to perform network negotiation with a device, other than the first access network device, among the at least two access network devices to determine whether the first access network device is a configuration device; and
when the first access network device is the configuration device, generate measurement gap configuration information, wherein the measurement gap configuration information is used for configuring a measurement gap for the terminal, and the measurement gap is used to indicate a period of time during which the terminal performs signal measurement at a frequency point other than any serving frequency point for the at least two access network devices, and wherein the at least two access network devices belong to a same communication system which comprises a Fourth Generation (4G) system or a Fifth Generation (5G) system, or the at least two access network devices belong to different communication systems which comprise a Fourth Generation (4G) system and a Fifth Generation (5G) system; and
the processor is configured to control the transceiver to send the measurement gap configuration information directly or indirectly to the terminal through Radio Resource Control (RRC) signaling.

16. The access network device of claim 15, wherein the processor is configured to:
control, when performing the network negotiation with the device to determine whether the first access network device is the configuration device, the transceiver to receive configuration negotiation information sent by the device, wherein the configuration negotiation information is used for negotiating to determine an access point device that configures a measurement gap for the terminal; and
determine, according to the configuration negotiation information, whether the first access network device is the configuration device.

17. The access network device of claim 16, wherein the configuration negotiation information comprises a frequency point for a measurement gap to be configured for the terminal by the device.

18. The access network device of claim 16, wherein the configuration negotiation information comprises a configuration indication, the configuration indication is to indicate whether the device determines to configure a measurement gap for the terminal.

19. The access network device of claim 15, wherein the processor is configured to:
when a first predetermined condition is met, generate the measurement gap configuration information, wherein the first predetermined condition comprises one of:
a frequency point for a measurement gap to be configured for the terminal by the first access network device is as same as a frequency point for a measurement gap to be configured for the terminal by the device, and the frequency point is not a serving frequency point for the first access network device and a serving frequency point for the device;
a frequency point for measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not service frequency points for the first access network device and the device, and the frequency point for the measurement gap to be configured for the terminal by the first access network device and the frequency point for the measurement gap to be configured for the terminal by the device belong to a communication system corresponding to the first access network device or belong to a communication system corresponding to the device; or
a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not service frequency points for the first access network device and the device, and the frequency point for the measurement gap to be configured for the terminal by the first access network device and the frequency point for the measurement gap to be configured for the terminal by the device belong to different systems among communication systems corresponding to the first access network device and the device.

20. The access network device of claim 15, wherein the processor is further configured to:
when a second predetermined condition is met, determine to not generate measurement gap configuration information, wherein
the second predetermined condition comprises one of:

a frequency point for a measurement gap to be configured for the terminal by the device is a serving frequency point for the first access network device; or a frequency point for a measurement gap to be configured for the terminal by the first access network device is a serving frequency point for the device.

21. The access network device of claim 15, wherein the measurement gap configuration information comprises:

a measurement frequency point, a measurement period, and a time-domain position of the period of time, during which the terminal performs the signal measurement at the frequency point, in the measurement period.

22. A terminal, comprising a processor and a transceiver, wherein the processor is configured to control the transceiver to receive, through Radio Resource Control (RRC) signaling, measurement gap configuration information directly or indirectly from a first access network device among at least two access network devices, the first access network device being determined as a configuration device through network negotiation between the first access network device and a device, other than the first access network device, among the at least two access network devices, wherein the at least two access network devices have established connections with the terminal, the measurement gap configuration information is used for configuring a measurement gap for the terminal, and the measurement gap is to indicate a period of time during Which the terminal performs signal measurement at a frequency point other than any serving frequency point for the at least two access network devices, and wherein the at least two access network devices belong to a same communication system which comprises a Fourth Generation (4G) system or a Fifth Generation (5G) system, or the at least two access network devices belong to different communication systems which comprise a Fourth Generation (4G) system and a Fifth Generation (5G) system.

23. The terminal of claim 22, wherein the processor is further configured to control the transceiver to perform the signal measurement at the frequency point according to the measurement gap configuration information.

24. The terminal of claim 22, wherein the first access network device is determined as the configuration device based on configuration negotiation information received from the device, wherein the configuration negotiation information is used for negotiating to determine an access point device that configures a measurement gap for the terminal.

25. The terminal of claim 24, wherein the configuration negotiation information comprises a frequency point for a measurement gap to be configured for the terminal by the device.

26. The terminal of claim 24, wherein the configuration negotiation information comprises a configuration indication, the configuration indication is to indicate whether the device determines to configure a measurement gap for the terminal.

27. The terminal of claim 22, wherein the processor is configured to receive, directly or indirectly from the first access network device through the transceiver, the measurement gap configuration information generated when a first predetermined condition is met, wherein the first predetermined condition comprises one of:

a frequency point for a measurement gap to be configured for the terminal by the first access network device is as same as a frequency point for a measurement gap to be configured for the terminal by the device, and the frequency point is not a serving frequency point for the first access network device and a serving frequency point for the device;

a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to a communication system corresponding to the first access network device or belong to a communication system corresponding to the device; or a frequency point for a measurement gap to be configured for the terminal by the first access network device is different from a frequency point for a measurement gap to be configured for the terminal by the device, the frequency point for the measurement gap to be configured for the terminal by the first access network device and the frequency point for the measurement gap to be configured for the terminal by the device are not serving frequency points for the first access network device and the device, and the frequency point for the measurement gap to be configured for the terminal by the first access network device and the frequency point for the measurement gap to be configured for the terminal by the device belong to different systems among the communication systems corresponding to the first access network device and the device.

28. The terminal of claim 22, wherein the measurement gap configuration information comprises:

a measurement frequency point, a measurement period, and a time-domain position of the period of time, during which the terminal performs the signal measurement at the frequency point, in the measurement period.

* * * * *